July 8, 1969    E. A. OHM    3,454,325
OPTICAL WAVE MODULATOR WITH SUPPRESSED PIEZOELECTRIC RESONANCES
Filed Aug. 29, 1966

INVENTOR
E. A. OHM
BY
*Kenneth W. Mater*
ATTORNEY

United States Patent Office 3,454,325
Patented July 8, 1969

3,454,325
OPTICAL WAVE MODULATOR WITH SUPPRESSED PIEZOELECTRIC RESONANCES
Edward A. Ohm, Shrewsbury, N.J., assignor to Bell Telephone Laboratories, Incorporated, Murray Hill and Berkeley Heights, N.J., a corporation of New York
Filed Aug. 29, 1966, Ser. No. 575,860
Int. Cl. G02f 1/28; H01s 3/00
U.S. Cl. 350—160          6 Claims This invention relates to optical wave modulators and, more particularly, to electro-optic modulators for such waves in frequency ranges including baseband.

The use of electro-optic material, such as for example potassium dihydrogen phosphate (KDP), to modulate optical waves is now well known. In general, the changes in refractive index produced by changes in the magnitude of an electric field applied to the element through which the light to be modulated passes are used to produce changes in amplitude, frequency, or phase of the transmitted light.

An additional characteristic of KDP electro-optic elements is their piezoelectric nature, which produces resonances at frequencies in the 10 kilohertz to 100 kilohertz range. The presence of these spurious resonances has made it difficult if not impossible at times to obtain uniform modulation over a wide baseband width.

One object of the present invention is, therefore, to reduce unwanted piezoelectric resonances in KDP optical wave modulators.

An additional undesirable aspect of electro-optic modulators is the reflections and scattering of the incident optical wave from the surface of the solid element of modulating material. It has been found to be extremely difficult to reduce the amount of this reflection below an undesirably high level when the element is immersed in a gaseous medium. The present invention reduces the unwanted wave reflection and wave scattering.

In accordance with an illustrative embodiment of the invention, an electro-optic element is mechanically clamped in a double compression arrangement to eliminate low frequency resonances. The element is further immersed in a viscous fluid of dielectric constant equal to the dielectric constant of the element. This immersion not only damps out higher frequency resonances in both the transverse and the longitudinal directions defined with respect to the element, but also provides a reflectionless transition between the electro-optic material and its surrounding medium. The dual function of this surrounding medium is an important aspect of the invention.

In accordance with an illustrative embodiment of the invention, a rectangular electro-optic element is extended in one plane to be substantially larger than the interaction region for incident light, and the extended side portions of the element are mechanically clamped against lead strip members. The element is surrounded on portions of all six exposed side surfaces by a viscous fluid having a dielectric constant substantially equal to the dielectric constant of the element itself. The fluid permits incident optical waves to enter the modulating element without serious reflection and scattering, and damps out the high frequency resonances of the mechanically clamped electro-optic element.

The above and other objects of the invention together with its various features and advantages, will be more readily appreciated upon reference to the accompanying drawing and following description thereof.

Figure 1:
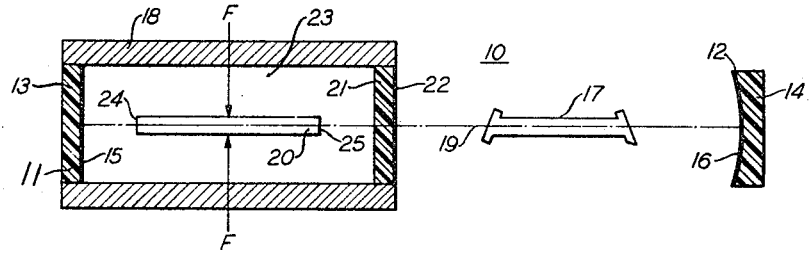
FIG. 1 is a semischematic view of an internal baseband modulator in accordance with the illustrative embodiment of the invention.

Referring now in detail to the embodiment of FIG. 1, there is shown a semischematic representation of an internal baseband modulator 10 comprising an optical cavity formed by reflectors 11, 12 which can be plane, curved, or a combination of plane and curved, as shown. Each of reflectors 11, 12 comprises a backing portion 13, 14, respectively, which can typically comprise a dielectric such as quartz carrying a reflecting surface 15, 16, respectively, comprising multiple quarter wave layers of material of alternately high and low dielectric constant. A complete description of such mirrors appears in an article by D. L. Perry, entitled, "Low-Loss Multilayer Dielectric Mirrors," published in the August 1965, issue of Applied Optics. Interposed within the optical cavity between reflectors 11, 12 are laser 17 and modulator 18, of which reflector 11 forms one end portion.

Laser 17 can be either a solid or a gaseous medium suitable for the generation of coherent optical wave energy. For purposes of illustration, the active medium is shown as a gaseous mixture, helium and neon for example, in an elongated tube. To minimize end reflections and to polarize the laser beam, the tube ends are inclined at the Brewster angle with respect to the cavity axis 19. A source, not shown in the drawing, is understood to be connected to the laser tube for supplying the power necessary to produce and to maintain a population inversion within the medium. It is to be understood that the active medium can comprise materials other than the gaseous mixture disclosed. For a detailed discussion of lasers, see the article by A. Yariv and J. P. Gordon, entitled, "The Laser," published in the January 1963, issue of the Proceedings of the Institute of Radio Engineers.

Modulator 18, also disposed within the cavity, comprises an electro-optic material 20 having an index of refraction which is controllable over a given range by the application of an electric field transverse to the direction of propagation of the light wave to be modulated. Typical electro-optic materials useful as optical wave modulators include ammonium dihydrogen phosphate (ADP) and potassium dihydrogen phosphate (KDP). At the end of modulator 18 opposite from reflector 11 is transparent low loss output window 21 having an antireflection coating 22 disposed thereon.

As mentioned hereinbefore, typical electro-optic materials are subject to physical resonances when subjected to modulating fields at frequencies between 10 and 100 kilohertz. These resonances have made broad baseband modulation in KDP and other similar optical wave modulators substantially impossible. As shown schematically in FIG. 1, the baseband frequency resonance phenomenon is eliminated in accordance with one aspect of the invention by applying mechanical clamping forces F to the modulation element. As will be seen from the description of the figures to follow, the modulating element itself, heretofore made only slightly larger than the actual volume of the optical beam to be modulated, is extended in one transverse dimension to provide side portions which can be mechanically clamped. The effect of the clamping is to increase the stiffness of the modulating element by a factor of $10^4$ to $10^6$. Since the resonance frequencies are related to the square root of the element stiffness, the resonance frequencies are driven into the 1 to 10 megahertz range. These higher resonant frequencies are then substantially damped by the presence of viscous fluid 23 which surrounds element 20.

The presence of fluid 23, which typically comprises an oil, for example, a silicone oil, with a dielectric constant substantially equal to that of KDP, serves not only to damp out the resulting resonances, but also to reduce the energy losses through scattering at the end surfaces 24, 25 of element 20. It has been found that the physical properties of typical electro-optic materials are such that the best polishing techniques produce a surface which, for optical frequency wavelength energy, is comparatively rough. By immersing the element, therefore, in a medium of matching dielectric constant, the end surface irregularities of the element are rendered "invisible" to the propagating energy. Windows 11, 21, which comprise dielectric material and surface layers of more highly polishable material, introduce negligible scattering losses. If desired, Brewster angle orientation of these windows can be employed.

Figure 2:
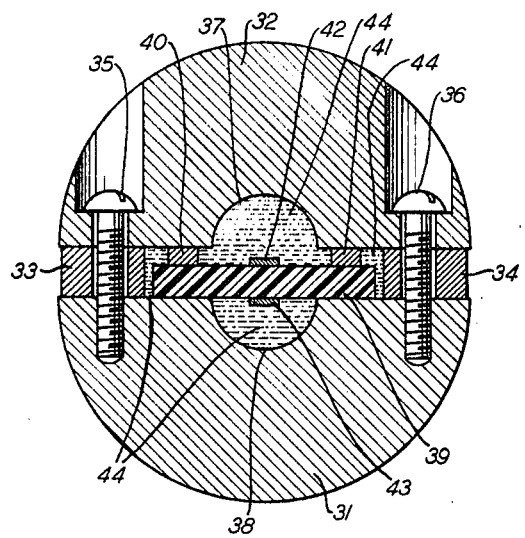
FIG. 2 is a transverse cross-sectional view of a modulation element for use in the modulator of FIG. 1.
Figure 3:
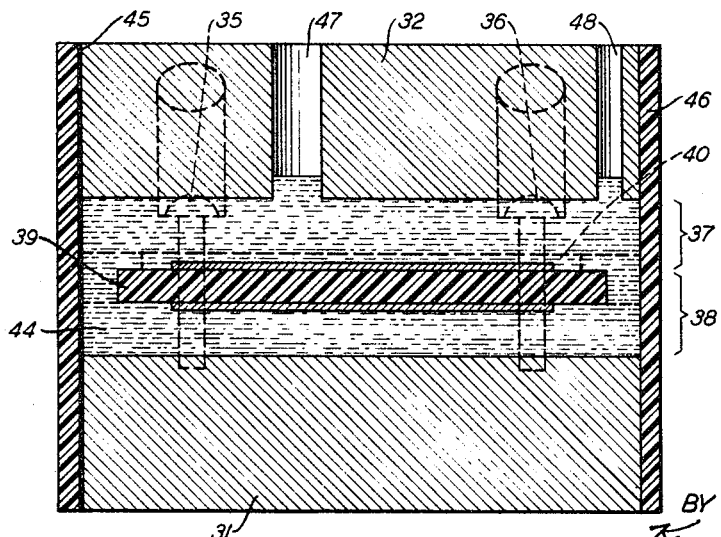
FIG. 3 is a longitudinal cross-sectional view of the modulation element of FIG. 2.

One illustrative embodiment, which incorporates the interacting clamping and damping features, is shown in FIGS. 2 and 3.

In FIG. 2, which is a transverse cross-sectional view of a modulation element which has been built and tested, solid right half cylindrical members 31, 32 are spaced apart by shims, or spacers, 33, 34. Both the members 31, 32 and the spacers 33, 34 comprise material of temperature coefficient similar to that of the electro-optic substance. A typical material is aluminum. Each of the members 31, 32 is tapped to accommodate compression means such as machine screws 35, 36 which pass through apertures in the spacer members. Similar compression means are provided at the opposite end of the modulating element.

Each of cylindrical members 31, 32 contains a cylindrical hollowed out portion, or cavity, 37 38 which extends along its central portions. Disposed within the cavity portions, and having an extent transversely between the clamping members 31, 32 greater than the transverse extent of the cavities, is electro-optic modulating element 39. The height of element 39 is selected to be less than the height of spacers 33, 34, and the width is selected to be less than the transverse distance between said spacers. Thin direct clamping strips 40, 41 of pliant material are positioned between the upper surface of element 39 and the lower surfaces of member 32. It has been found that lead is an advantageous material for these clamping strips. The thickness of these strips is an important parameter. Typically, the sum of the thickness of element 39 and strips 40, 41 is selected to be 0.5 mil more than the thickness of spacers 33, 34. When the modulator is assembled, machine screws 35, 36 are tightened until the lead is "hard clamped." This typically means that a sufficient pressure is applied by the screws 35, 36 to the spacers 33, 34 such that the yield pressure of 800 pounds per square inch of the lead strips 40, 41 is exceeded.

Extending the length of element 39 are oppositely disposed central electrodes 42, 43, which typically comprise a metal such as gold, and by which the modulating field is applied to the active element. External contacts to electrodes 42, 43 are not indicated, but would be provided in accordance with ordinary techniques well known in the art.

Surrounding element 39 on top, bottom, sides, and ends is viscous damping and matching fluid 44. After assembly of the mechanical assembly is complete, the fluid 44 can be introduced into the chamber surrounding element 39 through a prebored channel in one of members 31, 32. A second, bleeder, channel is also advantageous to permit the gaseous elements within the chamber to be exhausted and replaced by the entering fluid. The general orientations among the several parts of the modulator, described with reference to the transverse section of FIG. 2, can be more generally appreciated by a consideration of the longitudinal section of FIG. 3, in which reference numerals, where appropriate, have been carried over from FIG. 2.

In FIG. 3, the electro-optic element 39, with electrodes 42, 43, is illustrated positioned between aluminum clamping members 31, 32 within hollow cavities 37, 38. The clamping members are spaced apart by members 33, 34, not visible in FIG. 3, and held in place by machine screws 35, 36. Lead strip 40 is positioned between element 39 and upper clamping member 32. The cavities 37, 38 contain viscous damping fluid 44 and, as can be seen in the longitudinal section, the fluid fills the space between the ends of element 39 and both end reflector 45 and transparent end member 46. Thus the element 39 is surrounded on portions of all six sides by the damping fluid. The filling channel 47 and bleeder channel 48 are shown in dashed outline. Although the electrodes are shown in FIG. 3 as having a longitudinal extent less than that of the modulation element, these electrodes can equally well extend to the ends of the element.

In a typical operating setup, the modulator of FIGS. 2 and 3 is disposed as one extremity of an optical cavity with an additional reflector positioned opposite reflector 45 and on the axis of propagation of energy from a laser which is disposed between the reflectors on the cavity axis. The application of an electric field at baseband frequencies across the electro-optic material causes a variation in the refractive index of the material and produces frequency modulation of the laser beam passing therethrough. The mechanically clamped element, no longer resonant at the applied baseband frequencies, is still capable of resonances, either transverse or longitudinal, in amplitude variation, but at much higher frequencies. These frequencies, however, are effectively damped by the viscosity of the surrounding fluid. In addition, the laser beam crosses the interface between the electro-optic material and the fluid without scattering losses since the dielectric constants of the adjacent media are equal. Thus electro-optic modulation of optical waves over broad baseband frequencies is realizable.

In an operative modulator in accordance with the described embodiment of the invention, the modulation material used was KDP with a length of 1 inch, a width of 0.6 inch and a thickness of .06 inch. This element was disposed within aluminum half cylinders with an outside radius 1.125 inches and an inner cavity radius of 0.16 inch. The two half cylinders were separated by aluminum spacers having a thickness of 0.073 inch, and the lead spacers thus were 0.135 inch thick before compression. Gold electrodes .06 inch wide were deposited on the KDP surface and extended from end to end of the element. The matching fluid used, an oil comprising halogenated aromatic and aliphatic compounds, was supplied by Cargille Laboratories, Cedar Grove, N.J., under the designation Code 5042.

It should be understood that the disclosure of a reflective surface as one extremity of the modulation element housing is not intended to be limiting. Both end plates could be transparent, the unit itself being placed within an optical cavity formed by a pair of external reflectors. Losses would, however, tend to be greater in such an arrangement. Other variations, readily accomplished by skilled workers in the art, are likewise intended to be included within the scope of this invention.

What is claimed is:

1. An optical wave modulation component comprising an element of electro-optic material characterized by piezoelectric resonances in the 10 to 100 kilohertz range,
    means for raising the exhibited resonance frequencies of said element above said range of mechanical clamping,
    and means for damping the resonances at the raised frequencies.

2. The modulation component according to claim 1 in which said electro-optic material is clamped through lead with a yield pressure of 800 pounds per square inch.

3. The modulation component according to claim 1 in which said damping means comprises a viscous fluid having a dielectric constant substantially equal to the dielectric constant of said element.

4. An optical wave modulator comprising
a source of optical waves,
a source of a broad baseband frequency range modulating signal,
an element of electro-optic material having characteristic resonances within said broad baseband frequency range,
means for applying said optical waves and said modulating signal to said element,
means for mechanically clamping said element to increase the stiffness thereof and to raise said resonances out of said frequency range,
and means for damping said raised resonant frequencies.

5. The modulator according to claim 4 in which said clamping means includes the application of physical compression forces through a pliant material having a yield point of approximately 800 pounds per square inch.

6. The modulator according to claim 4 in which said damping means comprises a viscous fluid having a dielectric constant substantially equal to the dielectric constant of said element.

References Cited

UNITED STATES PATENTS 3,153,204  10/1964  Dunsmuir _____ 331—94.5

OTHER REFERENCES

Jones, Methods of modulating light at extreme frequencies, Journal of Scientific Instruments, vol. 41, November 1964, pp. 653–661.

ROY LAKE, *Primary Examiner.*

S. H. GRIMM, *Assistant Examiner.*

U.S. Cl. X.R.

331—94.5; 332—7.51; 350—150